United States Patent [19]

Okumura et al.

[11] Patent Number: 4,805,442
[45] Date of Patent: Feb. 21, 1989

[54] KNOCKING SENSOR FOR INTERNAL COMBUSTION ENGINE

[75] Inventors: Shigeo Okumura; Koshiro Inaba, both of Hamamatsu, Japan

[73] Assignee: Sanshin Kogyo Kabushiki Kaisha, Hamamatsu, Japan

[21] Appl. No.: 195,488

[22] Filed: May 17, 1988

Related U.S. Application Data

[63] Continuation of Ser. No. 908,259, Sep. 17, 1986, abandoned.

[30] Foreign Application Priority Data

Sep. 19, 1985 [JP] Japan .................... 60-205267

[51] Int. Cl.⁴ .................................. G01L 23/22
[52] U.S. Cl. ................................................. 73/35
[58] Field of Search ................ 73/35; 123/425, 435

[56] References Cited

U.S. PATENT DOCUMENTS

| 4,312,214 | 1/1982 | Kramer et al. | 73/35 |
| 4,667,637 | 5/1987 | Staerzl | 73/35 |

FOREIGN PATENT DOCUMENTS 61-13126  1/1986  Japan .................... 73/35

Primary Examiner—John Chapman
Attorney, Agent, or Firm—Ernest A. Beutler

[57] ABSTRACT

A device for controlling the ignition of an internal combustion engine to eliminate knocking and including a knocking sensor and method for detecting knocking. The knocking sensor is positioned in proximity to one cylinder of the engine and a reference signal is generated when another of the cylinders fires. This reference signal is compared with the output of the knocking sensor to determine a knocking condition.

10 Claims, 2 Drawing Sheets

4,805,442

KNOCKING SENSOR FOR INTERNAL COMBUSTION ENGINE

This is a continuation of U.S. patent application Ser. No. 908,259, filed Sep. 17, 1986, now abandoned.

BACKGROUND OF THE INVENTION

This invention relates to a knocking sensor for an internal combustion engine and more particularly to an improved knocking sensor that will give accurate signals regardless of variations in the sensor internal conditions.

The use of knock sensors for internal combustion engines is becoming more common. One of the uses for such knock sensors is to control the ignition timing so as to provide optimum ignition timing under all conditions while at the same time preventing the damage to the engine by knocking. An arrangement wherein such a knock sensor is employed is shown in U.S. Pat. No. 4,606,315, issued Aug. 19, 1986, entitled "Ignition Control System For Internal Combustion Engine" and assigned to the assignee of this application.

Knock sensors are of a wide variety of types and many of them operate to provide a signal indicative of a knocking condition by comparing an instantaneous signal with a reference signal. One way that this is done is that the knock sensor memorizes a reference signal which existed slightly before the time of ignition and compares this with the actual signal received at all times. The use of such reference signals is advantageous due to the variation of the internal components of the sensor which may occur with time or to filter out conditions such as external or internal noise. However, when such a reference signal is employed, there is a danger that the reference signal will be set as the signal which indicates actual knocking, for example, if the reference signal is set at the time when ignition or knocking actually occurs, and thus actual knocking of the engine will not be sensed.

It is, therefore, a principal object of this invention to provide an improved knock sensor for an internal combustion engine.

It is another object of this invention to provide a knock sensor for an internal combustion engine that will provide an accurate signal and yet which is quite similar to the prior art type of construction.

SUMMARY OF THE INVENTION

A first feature of the invention is adapted to be embodied in a knock sensor for an engine that has at least two spaced cylinders that fire alternately. A knock sensor is mounted in proximity to one of the cylinders and is spaced from and at least partially isolated from the other of the cylinders. Means are provided for recording a reference signal when the other of the cylinders fires and means compare the signal from the knock sensor with that reference signal to determine when a knocking condition occurs.

Another feature of the invention is adapted to be embodied in a method for sensing knocking in an engine hvine two spaced, alternately firing cylinders. In accordance with this feature of the invention, a reference signal is generated at one of the cylinders when the other of the cylinders fires. This reference signal is then compared with the actual signal at the one cylinder to determine when a knocking condition exists.

DETAILED DESCRIPTION OF THE PREFERRED EMBODIMENT

Figure 1:
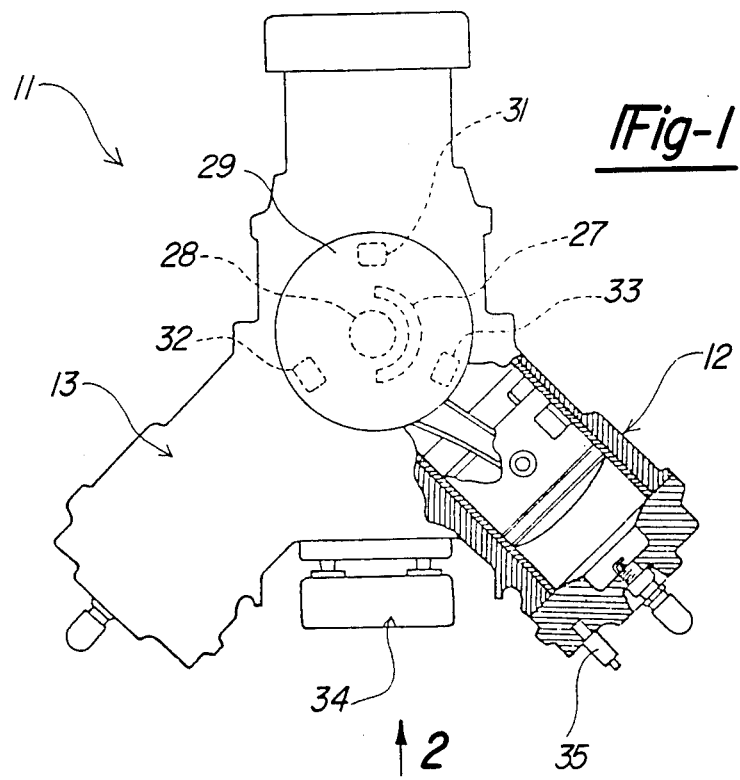
FIG. 1 is a top plan view, with a portin broken away, of an internal combustion engine having a knock sensor and knock sensing method embodying the invention.
Figure 2:
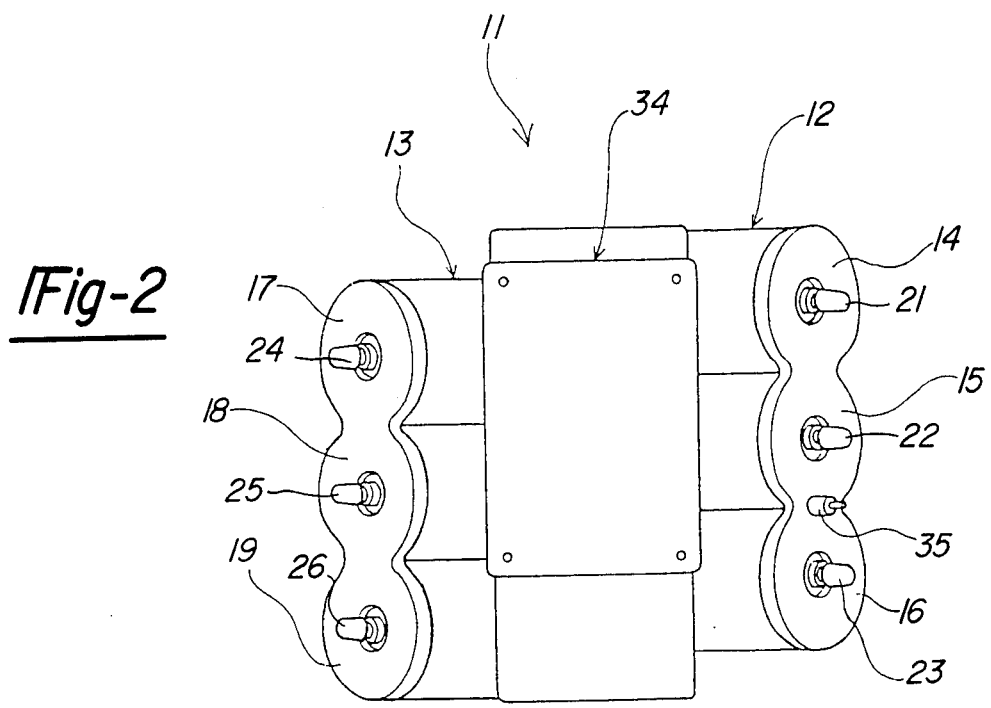
FIG. 2 is a side elevational view of the engine looking generally in the direction of the arrow 2 in FIG. 1.

Referring first to FIGS. 1 and 2, an internal combustion engine constructed in accordance with an embodiment of the invention is identified generally by the reference numeral 11. In the illustrated embodiment, the engine 11 is particularly designed for use in an outboard motor application. It is to be understood, however, that the invention can be used in any other type of engine installation. The engine 11 is depicted as being of the V type and includes a cylinder block that includes a first cylinder bank 12 and a second cylinder bank 13 with the cylinder banks 12 and 13 being disposed at an angular relationship to each other. Although the invention is described in connection with a V type engine, it is to be understood that the invention may be practiced with engines having other cylinder configurations. However, it is important that the engine have at least two alternatley firing cylinders and that these cylinders are related in such a way that vibration from one of these cylinders will be attenuated in its transmission to the other of the cylinders. A V type engine lends itself particularly to the application of this feature.

Each cylinder bank 12 and 13 has a plurality of cylinders. In this embodiment, the engine is of the V6 type and, therefore, the cylinder bank 12 is provided with cylinders 14, 15, and 16 while the cylinder bank is provided with cylinders 17, 18 and 19. The internal components of the respective cylinders 14 through 19 are shown partially in FIG. 1. As depicted, the engine is of the reciprocating type and, in accordance with the illustrated embodiment, operates on the two-stroke, crankcase compression principle. Since the specific internal details of the engine 11 are not relevant to the understanding of the invention, they will not be described in any further detail.

Figure 3:
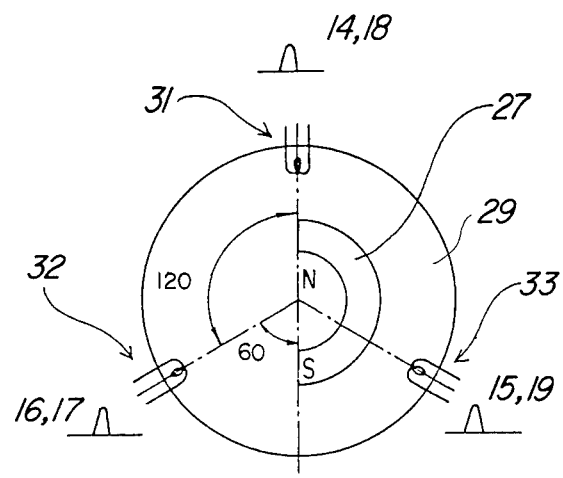
FIG. 3 is a partially schematic view showing a portion of the ignition circuit of the engine.

Each of the cylinders 14 through 19 is provided with a respective spark plug 21, 22, 23, 24, 25, and 26. The spark plugs 21 through 26 fire alternately and in accordance with an angular relationship as shown in FIG. 3. The ignition system for the spark plugs 21 through 26 may be of any known type and includes a rotating magnet 27 (FIG. 3) that is affixed for rotation with the crankshaft 28 of the engine in a known manner. The rotating magnet 27 is of the annular type and has its poles arranged as shown in FIG. 3. The magnet 27 may be conveniently affixed for rotation with a flywheel 29 of the engine, as is well known in this art.

Figure 4:
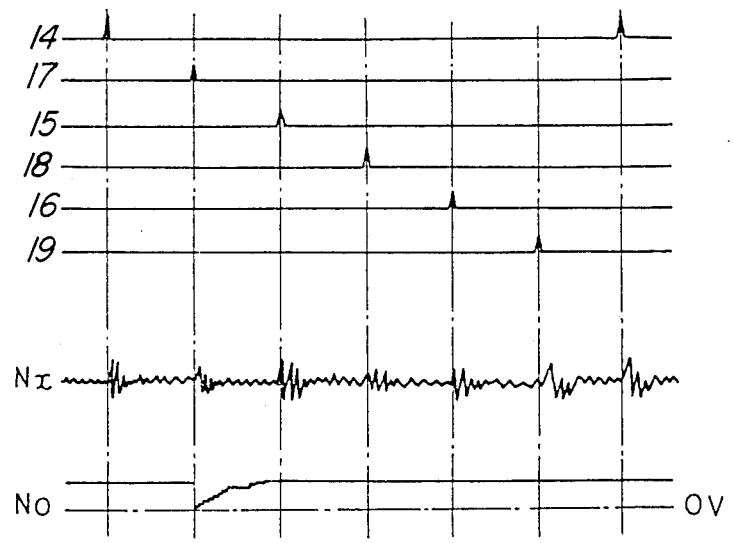
FIG. 4 is a diagrammatic view showing the ignition pulses of the engine, the actual vibration signals received by a knock sensor and the method and generation of the knock sensor reference signal.

Three pulser coils 31, 32 and 33 are affixed to the cylinder block of the engine in proximity to the flywheel 29 and specifically to the rotating magnet 27. The pulser coils 31, 32 and 33 are disposed at angles of 120 degrees with respect to each other about the axis of rotation of the crankshaft 28. The pulser coils 31, 32 and 33 provide a voltage pulse as indicated by the respective curves as shown in FIG. 3 when the rotating magnet 27 passes them. The pulser coils 31, 32 and 33 are in circuit with an appropriate ignition and control circuit, contained within a control box 34 that is mounted on the engine cylinder block between the banks of cylinders 12 and 13 in an appropriate manner. The pulser coil 31 is associated with the circuit for controlling the spark plugs associated with the cylinders 14 and 18 while the pulser coil 32 is associated with the spark plugs of the cylinders 16 and 17. The pulser coil 33 is associated with the spark plugs of the cylinders 15 and 19. As may be seen in FIG. 4, the firing order for the engine is such that the cylinder 14 fires first, the cylinder 17 fires second, the cylinder 15 fires third, the cylinder 18 fires fourth, the cylinder 16 fires fifth and the cylinder 19 fires last. The ignition circuit for achieving these firings may be of any known type and preferably is the type that uses an SCR for its triggering device which is controlled via the pulses from the pulser coils 31, 32 and 33. Since the specific ignition system forms no part of this invention, it is not described in detail.

A knock sensor, indicated generally by the rederence numeral 35, and which may be of any known type, is mounted in the cylinder bank 12 in proximity to the cylinders 15 and 16. The knock sensor 35 is sensitive to vibrations and outputs a signal $N_I$ which indicates the magnitude of the vibrational signal. As may be readily seen in FIG. 4, the amplitude of the vibrations increase immediately upon the firing pulse of each of the cylinders. However, the amplitude of the vibrations caused during firing of the cylinders 14, 15 and 16 of the cylinder bank 12 are substantially greater than those of the bank 13 containing the cylinders 17, 18 and 19. This difference in amplitude is employed to generate the reference signal, as will become apparent. Also, it should be noted that the curve $N_I$ indicates the impulses during normal firing wherein the vibrations do not reach any large magnitude until after the spark plugs 21, 22, 23, 24, 25 and 26 have been fired thus indicating normal combustion.

In accordance with the invention, the ignition box 34 also includes a microprocessor that receives the signals from the knocking sensor 35. This microprocessor includes a device for sensing the firing of a cylinder other than a cylinder in the bank 12, for example, the cylinder 17 which may be considered to be the reference cylinder and begins an integrating function of the position pulse output of the knocking sensor 35 during the time of firing as indicated by the pulsing of the pulser coil 32. This integrated signal is indicated on reduced scale on the graph $N_O$ and when it reaches its maximum, it is memorized as indicated by the solid line view until the cylinder 17 again fires at which time the integration function is repeated. Hence, the signal $N_O$ comprises a reference signal which indicates a vibration condition which is less than that which occurs during normal engine firing of the cylinder 15. Thus, this reference signal will be less than the actual vibrational signal occuring even at the maximum condition after firing of the spark plug 22. By comparing the output of the knocking sensor 35 with this reference signal, it can be determined if there is an actual knocking condition and the ignition timing can be retarded by the arrangement shown in aforementioned U.S. Pat. No. 4,606,315.

It should be readily apparent from the foregoing description that this device is particularly effective in providing an accurate reference signal and that this reference signal can be compared with the actual signal generated by the cylinder of the bank in which the knocking sensor is positioned so as to determine when a knocking condition actually exists. Thus, the disadvantages of the prior art devices are avoided and accurate control is possible. It is to be understood that the foregoing description is that of a preferred embodiment of the invention and that various changes and modifications may be made without departing from the spirit and scope of the invention, as defined by the appended claims.

We claim:

1. A knocking sensor for an engine having at least two cylinders spaced so that the engine construction effects vibration damping therebetween that fire alternatively, a knocking sensor mounted in proximity to one of said cylinders and spaced from the other of said cylinders, means for effecting and recording a reference signal commencing immediately after the other of said cylinder fires, and means for comparing the signal from said knocking sensor with said reference signal commencing immediately after the one cylinder fires to determine a knocking condition in the one cylinder.

2. A knocking sensor as set forth in claim 1 wherein the engine has separate cylinder banks and the one cylinder is formed in one of the cylinder banks and the other cylinder is formed in the other of the cylinder banks.

3. A knocking sensor as set forth in claim 1 further including a position sensor for initiating the reference signal when the other of the cylinders fires.

4. A knocking sensor as set forth in claim 3 further including means for holding the reference signal until the other cylinder again fires.

5. A knocking sensor as set forth in claim 4 wherein the engine has separate cylinder banks and the one cylinder is formed in one of the cylinder banks and the other cylinder is formed in the other of the cylinder banks.

6. A knocking sensor as set forth in claim 5 wherein there are multiple cylinders in each of the cylinder banks.

7. A method for sensing the knocking of an engine having two spaced cylinders that fire alternatively and including a knocking sensor mounted in proximity to one of the cylinders and spaced from another of the cylinders comprising the steps of effecting and recording a reference signal immediately after the other of the cylinders fires and comparing the signal from the knocking sensor immediately after the one of the cylinder fires with the reference signal to determine a knocking condition in the one cylinder.

8. A method as set forth in claim 7 wherein the cylinders are formed in separate cylinder banks.

9. A method as set forth in claim 7 further including holding the reference signal until the other of the cylinders again fires.

10. A method as set forth in claim 9 wherein the cylinders are formed in separate cylinder banks.

* * * * *